Patented July 28, 1953

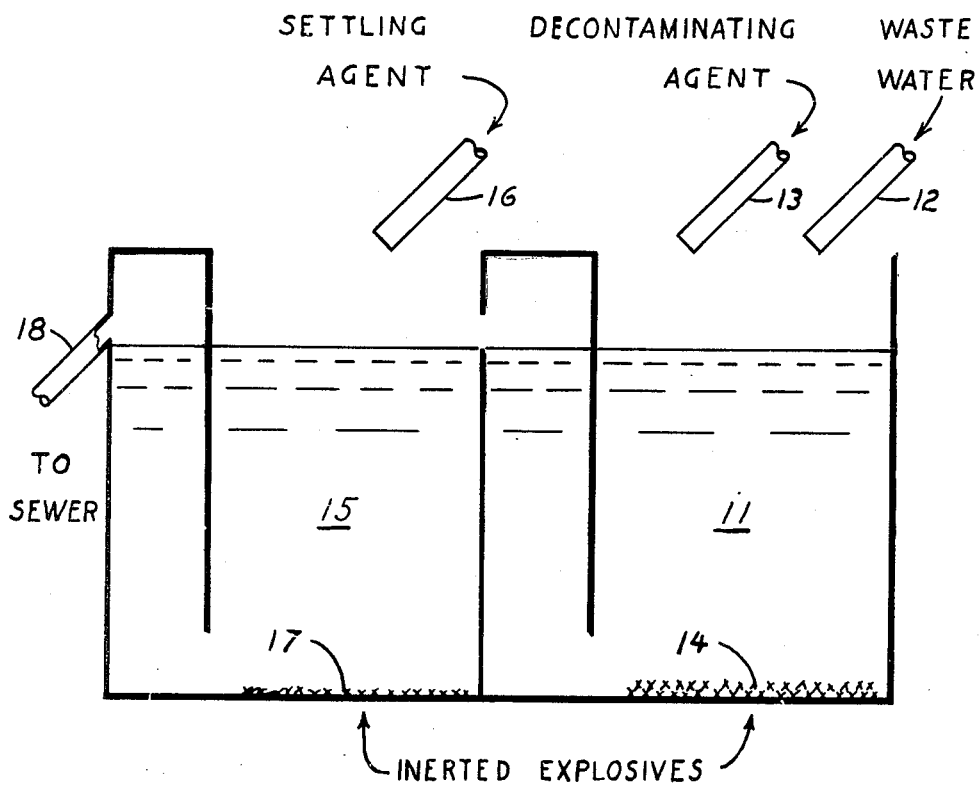

2,647,084

UNITED STATES PATENT OFFICE 2,647,084

DECONTAMINATION OF EXPLOSIVES CONTAMINATED MATERIALS

Louis McDonald, Inyokern, Calif.

Application November 18, 1947, Serial No. 786,596

2 Claims. (Cl. 210—2)

(Granted under Title 35, U. S. Code (1952), sec. 266)

This invention relates to a method and material for decontaminating waste residues and related materials, which have become contaminated with high explosives.

It is an object of this invention to provide for the inerting of certain explosives in certain waste waters, and the like.

It is another object of this invention to decontaminate certain explosive-containing materials to a more complete degree than has been possible herebefore.

It is a further object of this invention to provide for the substantially complete decontamination of explosive-contaminated material, particularly waste water, without increasing in the slightest the explosive hazard, during the process.

The problems of waste disposal, soil pollution, and water pollution, resulting from contamination adjacent explosives plants, and the associated hazards, constitute serious limitations on the sites which may be employed for explosives processing establishments. In addition, there are fire and explosive hazards resulting from the deposition of waste explosives on plant equipment and soil. The waste material contemplated by the invention comprises essentially water and explosive. An example of the type of waste to be decontaminated by the instant method is wash water from explosive processing plants. For example, during machining, packaging, and forming operations on explosives, the dust which is produced is continuously washed down with water which must then be decontaminated. The solubility of TNT in water as well as the solubility of many other explosives increases as the pH of the water increases. The tap water used for washing down explosive waste is practically always on the alkaline side. The solubility also increases as the temperature goes up with the result that the waste water during periods of warm weather may contain considerable amounts of explosive in solution in addition to undissolved particles in suspension. The composition of the waste mixture changes to a limited extent upon standing, as evidenced by the formation of a dark color, but the effectiveness of the instant method of decontamination is not affected thereby.

Furthermore, a serious toxic hazard is created by the venting of waste water contaminated with explosives into surface water supplies which are used as a source of raw water for domestic and industrial consumption. As little as five parts of TNT per million renders water unfit for drinking, and as little as 2 p. p. m. reduces the normal biochemical oxygen demand by as much as 30%. Aromatic nitro substituted explosive compounds such as TNT are not removed from water by biochemical purification and subsequent filtration and/or settling. On the contrary the presence of TNT in water in amounts as low as 44 p. p. m. greatly inhibits normal anaerobic sewage digestion.

Presently known methods for treatment of explosives contaminated waste waters include alkali treatment plus percolation through soil; treatment with activated carbon; and precipitation with ferrous salts and alkali. For example see "Industrial and Engineering Chemistry," vol. 37, page 937. Execution of these methods presents many difficulties, one of the principal drawbacks being the fact that the explosive hazard is increased when TNT is treated with alkali. Furthermore, at best, only 65 to 75% removal of TNT can be expected.

Another known method which is far from satisfactory involves chlorination and subsequent filtration through activated carbon.

In accordance with the instant invention, explosives contaminated material is treated with small amounts of an agent capable of inerting the explosives by forming therefrom insoluble addition compounds.

The decontaminating agent of this invention comprises a quaternary salt of the halide of a group V non-metal (ammonium or phosphonium halide); or expressed otherwise, an aryl halide of a group V non-metal, i. e. nitrogen or phosphorus. The general formula for decontaminating agents of the instant invention is:

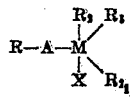

wherein:

R is (a) an alkyl nucleus or (b) an aryl nucleus or (c) an alkyl substituted aryl nucleus A is (a) an alkylene group or (b) a free valence bond M is (a) a nitrogen atom or (b) a phosphorus atom X is a halogen atom $R_2$ is (a) an alkyl group or (b) a hydrogen atom $R_3$ is (a) an alkyl group or (b) a hydrogen atom, and $R_4$ is (a) an alkyl group or (b) an amido alkyl group Of the above group of compounds it is preferred that $R_3$ be a long chain alkyl or amido alkyl group, having from 8 to 22 carbon atoms. A typical and satisfactory compound coming within the scope of the instant invention is benzyl di methyl, cetyl, ammonium chloride:

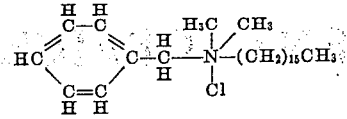

The mechanism of the reaction involved in the decontamination of dissolved explosives of the type hereinafter designated is not known with absolute certainty. The explosive in true solution is removed in the form of a heavy, water insoluble compound. This compound is not an explosive. The pH of the solution being decontaminated decreases slightly as the quaternary halide is added; it may be inferred that a hydrogen halide, e. g. hydrochloric acid, is produced as the explosive and the quaternary compounds combine.

The method of the instant invention wherein an insoluble precipitate is formed by a reaction is not to be confused with the solubilizing of organic substances by cationic surface active materials. Such a phenomenon involves micellar adsorption and may be induced by anionic as well as cationic materials.

Explosive materials which are susceptible of treatment in accordance with the instant invention are those which exhibit slight to moderate water solubility and which have dissociation constants in the order of $5 \times 10^{-15}$ or greater, to form acidic or neutral water solutions. These compounds may be generally designated as aromatic (aryl) nitro substituted explosives, and are exemplified by the following:

Tri nitro toluene
Picric acid
Ammoniumpicrate
Tetratol (80 tetryl-20 TNT)
2-4-6 tri nitrophenyl methyl nitramine (tetryl)
Tri nitro resorcinol
Tri nitro cresol
Tetra nitro naphthylene
Tri nitroanisol
Tri nitroxylenes
Diazodinitro phenol Decontaminating agents of the general formula given hereinbfore are typified by:

| Name | Formula |
|---|---|
| Benzyl di methyl dodecyl ammonium chloride. | $C_6H_5CH_2NCl(CH_3)_2(CH_2)_{11}CH_3$ |
| Methyl cetyl piperidium chloride. | $H_3C(CH_2)_{15}NCH_3Cl(CH_2)_4$ |
| Benzyl di methyl cetyl phosphonium chloride. | $C_6H_5CH_2PCl(CH_3)_2(CH_2)_{15}CH_3$ |
| Benzyl di methyl cetyl ammonium chloride. | $C_6H_5CH_2NCl(CH_3)_2(CA_3)_{15}CH_3$ |
| Tri-methyl cetyl ammonium chloride. | $(H_3C)_3NCl(CH_2)_{15}CH_3$ |
| Cetyl pyridium chloride | $H_3C(H_2C)_{15}-N\begin{smallmatrix}CH-CH\\ \\Cl\end{smallmatrix}CH$ |
| Tri-methyl cetyl phosphonium chloride. | $(H_3C)_3PCl(CH_2)_{15}CH_3$ |
| Benzyl tri-methyl ammonium chloride. | $C_6H_5CH_2NCl(CH_3)_3$ |

The single drawing herein illustrates schematically one form of apparatus which may be used in the practice of the instant invention. Inasmuch as most explosives processing and shell loading plants vent contaminated waste waters into settling tanks to settle out waste materials, practice of the instant invention is greatly simplified, for it is merely necessary to add the instant decontaminating agent to such catch basins and effect the reaction to inert the explosive by formation of the insoluble compound.

Settling of the compound may be accelerated and improved by the addition of a settling agent such as activated silica in a weight approximately equal to that of the decontaminating agent. Alternatively, sodium sulfate or similar electrolyte may be added in an amount equal to approximately four times that of the decontaminating agent employed.

Referring to the drawing, waste water is flowed into a chamber 11 from an inlet 12. A decontaminating agent as taught herein is flowed into the chamber 11 through the pipe 13. The explosives compounds in the waste water are insolubilized and settle to the bottom of the chamber 11 in the form of a precipitate 14. The water then flows into a second chamber 15 to which a settling agent may be added through the pipe 16 as taught hereinbefore. Additional inerted material is adsorbed by the settling agent and forms a precipitate 17. The decontaminated waste water is then discharged through the outlet 18.

It is preferred to add through the pipe 13 decontaminating agents in slight excess of the amount actually required for the reaction with the explosives. This excess reduces the surface tension of the waste water and thereby makes possible the rapid wetting of undissolved crystalline explosives such as pentaerythritol tetranitrate, undissolved TNT, etc. which are suspended in the waste water. These solids, having densities in the order of 1.6 to 1.8 grams per cubic centimeter, settle very rapidly once they are wetted. The precipitated explosives and insolubilized compounds 14 and 17 are removed periodically and destroyed by burning, by the use of an auxiliary fuel or untreated waste explosives.

The compounds formed are insensitive to impact and do not readily support combustion. For example, a sample prepared by the reaction of benzyl dimethyl cetyl ammonium chloride with alpha TNT in aqueous solution failed to fire when subjected to standard impact test on a Bureau of Mines #2 Impact Tester, with a 130 centimeter fall of a 2 kilogram weight using an anvil covered with 000 sand paper.

Under the same conditions of test TNT is detonated (50% positive shots) with a 90 centimeter 2 kilogram weight drop. In a typical plant run, TNT and various explosive mixtures containing TNT were cast and machined to form various shapes. The cleaning of dust and residues from melting kettles and other equipment was accomplished by melting the explosive with hot wash water which was then voided directly to a tank of the type shown in the drawing. The wash water was slightly alkaline (pH 8.2–8.6) and was heated to above the melting point of TNT (81° C.); the concentration of TNT in the waste water ranged up to 1,200 parts per million. The removal of TNT from water in the tank was accomplished by the use of benzyl-dimethyl-cetyl-ammonium chloride and sodium sulfate as follows. The water entering the tank was sampled each hour of the plant operating day. Estimation of the dissolved TNT was made colorimetrically with an electric photometer using di-ethylaminoethanol reagent and waste water standards containing known amounts of TNT, For every mole of dissolved TNT present as estimated from the concentration of TNT found in the waste water entering the tank, 1⅓ moles of benzyl-dimethyl-cetyl-ammonium chloride in solution weer metered into chamber 11. The rate of addition was based on the rate of flow of waste effluent into the tank. A weir was fitted in the effluent trough upstream of chamber 11 to obtain mean rates of flow. Sodium sulfate in an amount equal to three times the weight of benzyl-dimethyl-cetyl-ammonium chloride was added to the waste water in chamber 15. Waste water leaving the tank was sampled and examined for TNT content and pH. The following table is a summary of data derived from a five day plant run:

| Effluent | Volume Cubic Feet | Mean TNT Concentration, p. p. m. | Mean Temperature, Degrees F. | pH | Maximum TNT Concentration, p. p. m. | Minimum TNT Concentration, p. p. m. |
|---|---|---|---|---|---|---|
| Waste water entering catch basin | 15,000 | 620 | 130 | 8.3 | 1,200 | 90 |
| Waste water leaving catch basin | | 32 | 95 | 6.9 | 84 | 14 |

MATERIALS USED

| Material | Weight in lbs. |
|---|---|
| Benzyl-dimethyl-cetyl-ammonium chloride | 1,060 |
| Sodium sulfate | 3,000 |
| Estimated Total Lbs. TNT removed | 460 |

A greater proportion of TNT is removed from the waste water when the process is operated at lower temperatures and flow rates than employed in the above described plant run.

The invention described herein may be manufactured and used by or for the Government of the United States of America for governmental purposes without the payment of any royalties thereon or therefor.

What is claimed is:

1. A decontamination process comprising adding benzyl dimethyl cetyl ammonium chloride to an aqueous solution containing at least one member of the group consisting of alpha TNT, tetryl, trinitrocresol, trinitroanisol, and diazodinitrophenol, in an amount sufficient to react with substantially all of each member of the group present in solution and to provide a sufficient excess of said benzyl-dimethyl-cetyl-ammonium chloride to ensure rapid precipitation of insoluble compounds.

2. A decontamination process comprising adding a quaternary ammonium halide having at least one chain containing more than eight carbon atoms to an aqueous solution containing at least one member of the group consisting of TNT, tetryl, trinitroresorcinol, trinitrocresol, and diazodinitrophenol, in an amount sufficient to react with substantially all of each member of the group present in solution and to provide a sufficient excess of said quaternary ammonium halide to ensure rapid precipitation of insoluble compounds.

LOUIS McDONALD.

References Cited in the file of this patent
UNITED STATES PATENTS

| Number | Name | Date |
|---|---|---|
| 1,492,958 | Bots | May 6, 1924 |
| 2,029,960 | Urbain | Feb. 4, 1936 |
| 2,102,103 | Urbain et al. | Dec. 14, 1937 |
| 2,129,264 | Downing et al. | Sept. 6, 1938 |
| 2,236,930 | Uytenbogaart | Apr. 1, 1941 |
| 2,316,499 | Borglin | Apr. 13, 1943 |
| 2,383,775 | Craig et al. | Aug. 28, 1945 |

FOREIGN PATENTS

| Number | Country | Date |
|---|---|---|
| 622,301 | Germany | of 1935 |

OTHER REFERENCES

Industrial and Engineering Chemistry, vol. 37, No. 10, pp. 937-943.

Industrial and Engineering Chemistry, vol. 35, Oct. 1943, pp. 1122-1127.